(12) United States Patent
Suzuki (10) Patent No.: US 6,339,575 B1
(45) Date of Patent: Jan. 15, 2002

(54) LOADING MECHANISM FOR A DISK DEVICE

(75) Inventor: Toshiaki Suzuki, Furukawa (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/300,614

(22) Filed: Apr. 27, 1999

(30) Foreign Application Priority Data

May 28, 1998 (JP) .......................................... 10-146863

(51) Int. Cl.[7] .............................................. G11B 17/04
(52) U.S. Cl. .................................................... 369/77.1
(58) Field of Search .............................. 369/75.1, 75.2, 369/77.1, 77.2

(56) References Cited

U.S. PATENT DOCUMENTS

| | | | | |
|---|---|---|---|---|
| 4,701,901 A | * | 10/1987 | Imai ........................... | 369/75.2 |
| 5,142,523 A | * | 8/1992 | Kamoshita .................. | 369/75.2 |
| 5,386,403 A | * | 1/1995 | Morioka et al. .............. | 369/37 |
| 5,805,562 A | * | 9/1998 | Hisatomi ..................... | 369/191 |
| 5,995,468 A | * | 11/1999 | Furukawa ................... | 369/77.1 |
| 6,208,606 B1 | * | 3/2001 | Saito .......................... | 369/77.1 |
| 6,208,608 B1 | * | 3/2001 | Kurita ........................ | 369/77.2 |

* cited by examiner

Primary Examiner—David L. Ometz
Assistant Examiner—Franklin D. Altman, III
(74) Attorney, Agent, or Firm—Dilworth & Barrese, LLP (57) ABSTRACT

A loading mechanism for a disk device is provided wherein a single motor is commonly used to perform the functions of loading a disk, such as a CD-ROM or a DVD-ROM, within the disk device and feeding the disk to a data reading/writing device. The loading mechanism uses a rack and pinion arrangement to move a disk loading tray out of and into a base of the disk device to load and subsequently feed the disk to the data reading/writing device.

20 Claims, 8 Drawing Sheets

LOADING MECHANISM FOR A DISK DEVICE

BACKGROUND

1. Field of the Invention

The present invention relates to a disk device, such as a CD-ROM drive or a DVD-ROM drive, and more particularly, the present invention relates to a loading mechanism for a disk device for performing both a disk loading operation and a disk feeding operation as a disk loading tray is moved out of and into a base of the disk device.

2. Description of the Related Art

A disk loading operation must be performed in the use of a disk device, such as a CD-ROM drive, a DVD-ROM drive, or the like, to load an optical disk within the disk device. The disk loading operation entails placing the optical disk onto a disk loading tray while the tray is in a projected position with respect to a base of the disk device and then moving the tray to a received position to load the disk within the disk device.

In a conventional disk device, the disk loading tray is typically driven by a load motor of a loading mechanism to move the tray between the projected and received positions. Once the tray is moved to the received position, the disk is lifted from the disk loading tray as the base from which a spindle motor and a pickup are attached thereto is raised. The disk is then clamped by a clamping device and supported by a rotating shaft (i.e., turntable) operatively associated with the spindle motor. The pickup is then moved to a data reading/writing position by a feed motor to perform a data reading or writing operation.

It is evident from the above description that a conventional disk device requires a load motor and a feed motor to perform the disk loading and feeding operations, thereby increasing the manufacturing cost.

Accordingly, a need exists for a loading mechanism for a disk device wherein a single motor is commonly used to perform the functions of the load motor and the feed motor, thereby reducing the manufacturing cost.

SUMMARY

The present invention provides a loading mechanism for a disk device wherein a single motor is commonly used to perform the functions of loading a disk, such as a CD-ROM or a DVD-ROM, within the disk device and feeding the disk to a data reading/writing device. The loading mechanism uses a rack and pinion arrangement to move a disk loading tray out of and into a base of the disk device to load and subsequently feed the disk to the data reading/writing device. The loading mechanism for a disk device includes a tray rack operatively associated with a load gear which is rotated by a load motor for moving the disk loading tray from a projected position to a received position by hooking the disk loading tray. Once in the received position, the disk loading tray is unhooked by operatively disconnecting the tray rack from the load gear. The loading mechanism further includes a relay gear operatively associated with the tray rack for rotating as the tray rack is received into the base; a slide rack operatively associated with the relay gear for moving a damper from an unclamping position to a clamping position to clamp the disk; and a toggle lever capable of pivoting as the tray rack is moved within the base for operating a pickup rack for moving a data read/write pickup device to an operating position. Hence, a disk loading operation and a pickup feeding operation are performed by a single load/feed motor.

The slide rack for moving the damper includes a camming groove into which a camming protrusion formed in a damper holder is inserted. In operation, as the camming protrusion slides along the camming groove upon movement of the slide rack, the damper supported by the damper holder is moved from the unclamping position to the clamping position.

The loading mechanism of the present invention improves the operational reliability and tiring of the clamper, since the damper independently lowers and moves to the clamping position only after the disk loading tray has been precisely placed in the received position.

The loading mechanism further includes a projecting section which projects from the disk device as the slide rack moves toward the disk device to move the damper from the unclamping position to the clamping position. The projecting section provides an emergency ejecting operation upon depression of the projecting section toward the disk device. When the projecting section is pushed toward the disk device, the damper is moved to the unclamping position and the relay gear is reversely rotated to move the tray rack away from the disk device. This causes the disk loading tray to move toward the projected position. The projecting section is integrally formed at one end of the slide rack and projects from the disk device as the slide rack is moved away from the disk device by the reverse rotation of the relay gear. It is preferred for the damper holder to be supported at one end by the disk device to decrease the unclamping force necessary in moving the damper from the clamping position to the unclamping position.

DETAILED DESCRIPTION OF PREFERRED EMBODIMENTS

It is to be understood that in the following description of a preferred embodiment, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

Figure 1:
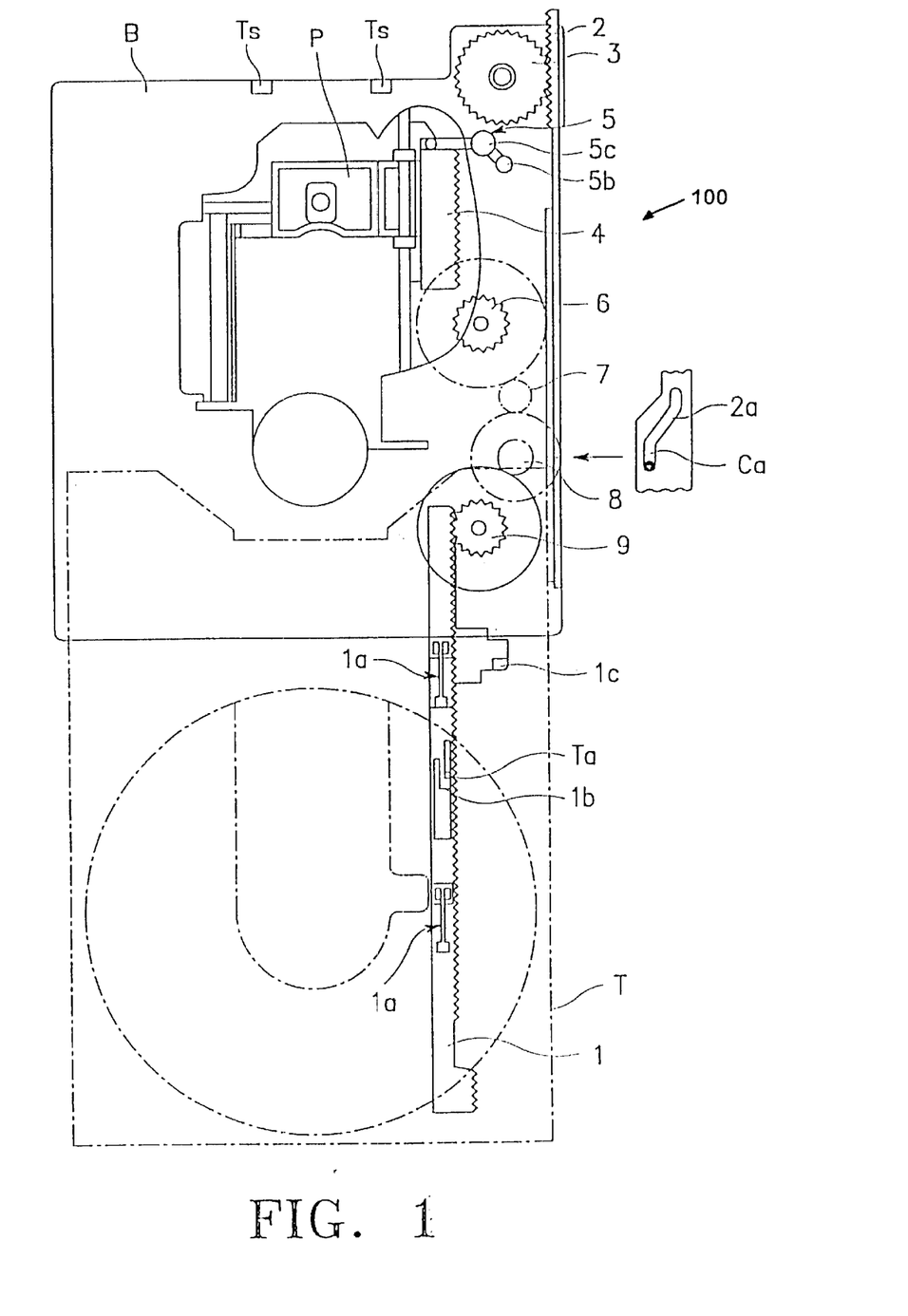
FIG. 1 is a top view of a loading mechanism in partial phantom cut-away for a disk device in accordance with the present invention, where a disk loading tray is in a projected position.
Figure 2:
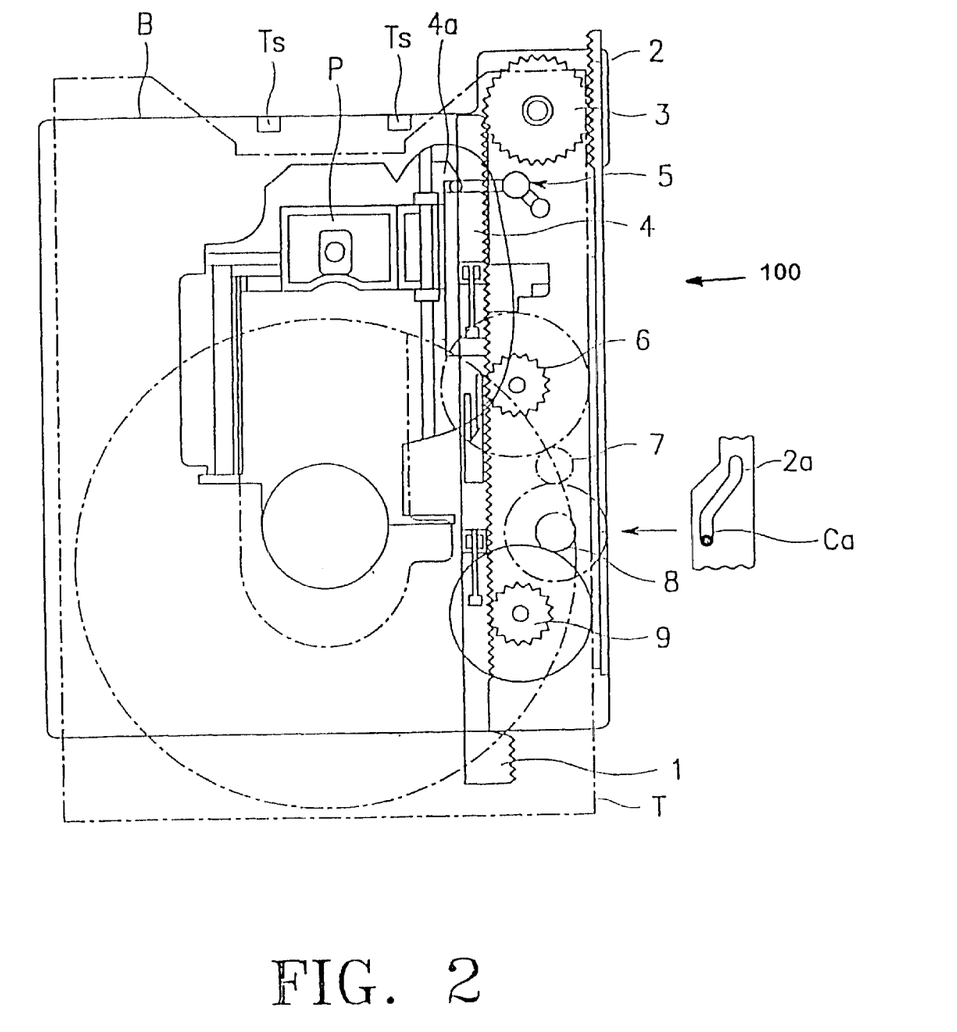
FIG. 2 is a top view of the loading mechanism in partial phantom cut-away for a disk device where the disk loading tray is between the projected position and a received position.
Figure 3:
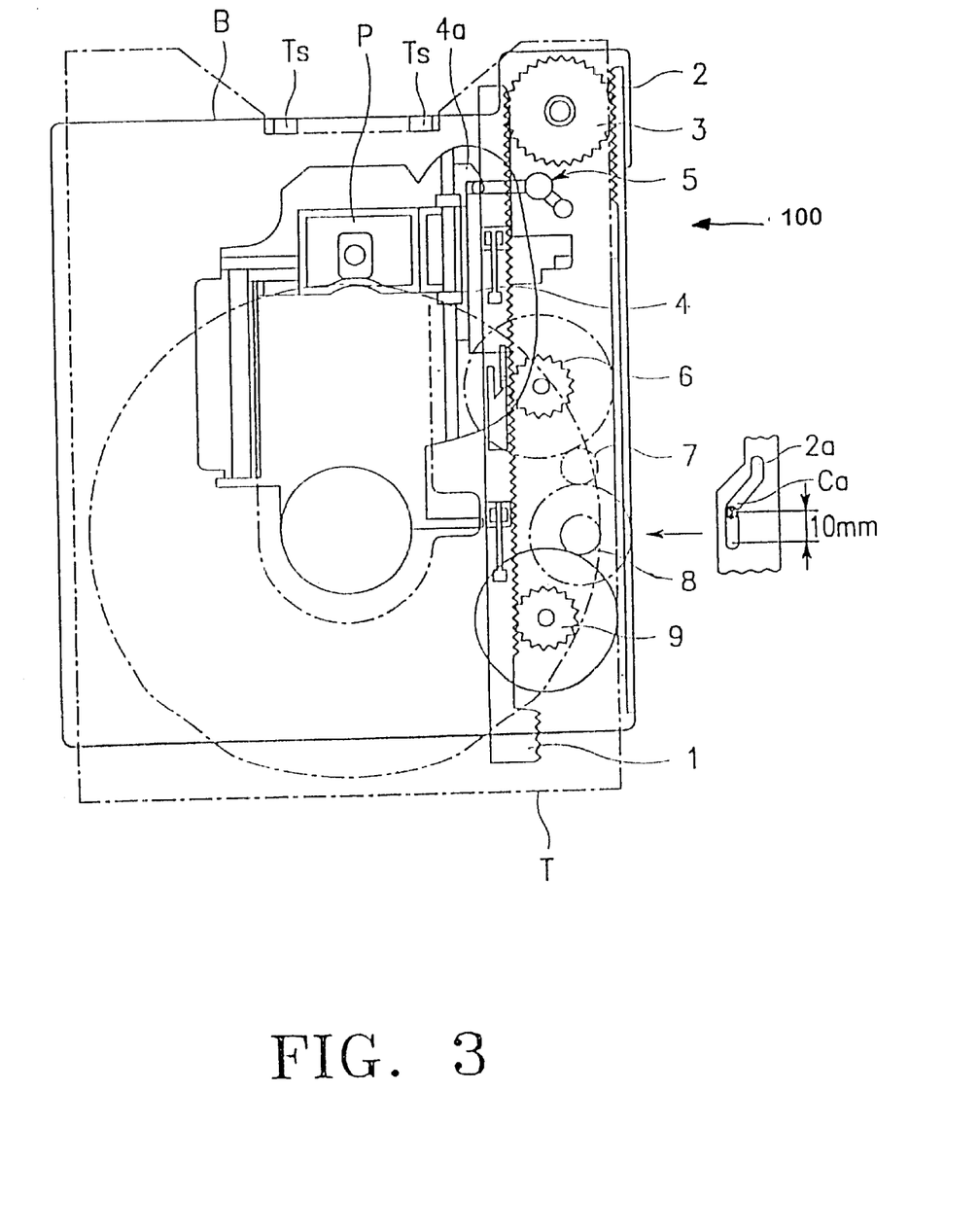
FIG. 3 is a top view of the loading mechanism in partial phantom cut-away for a disk device where the disk loading tray is in the received position.
Figure 4:
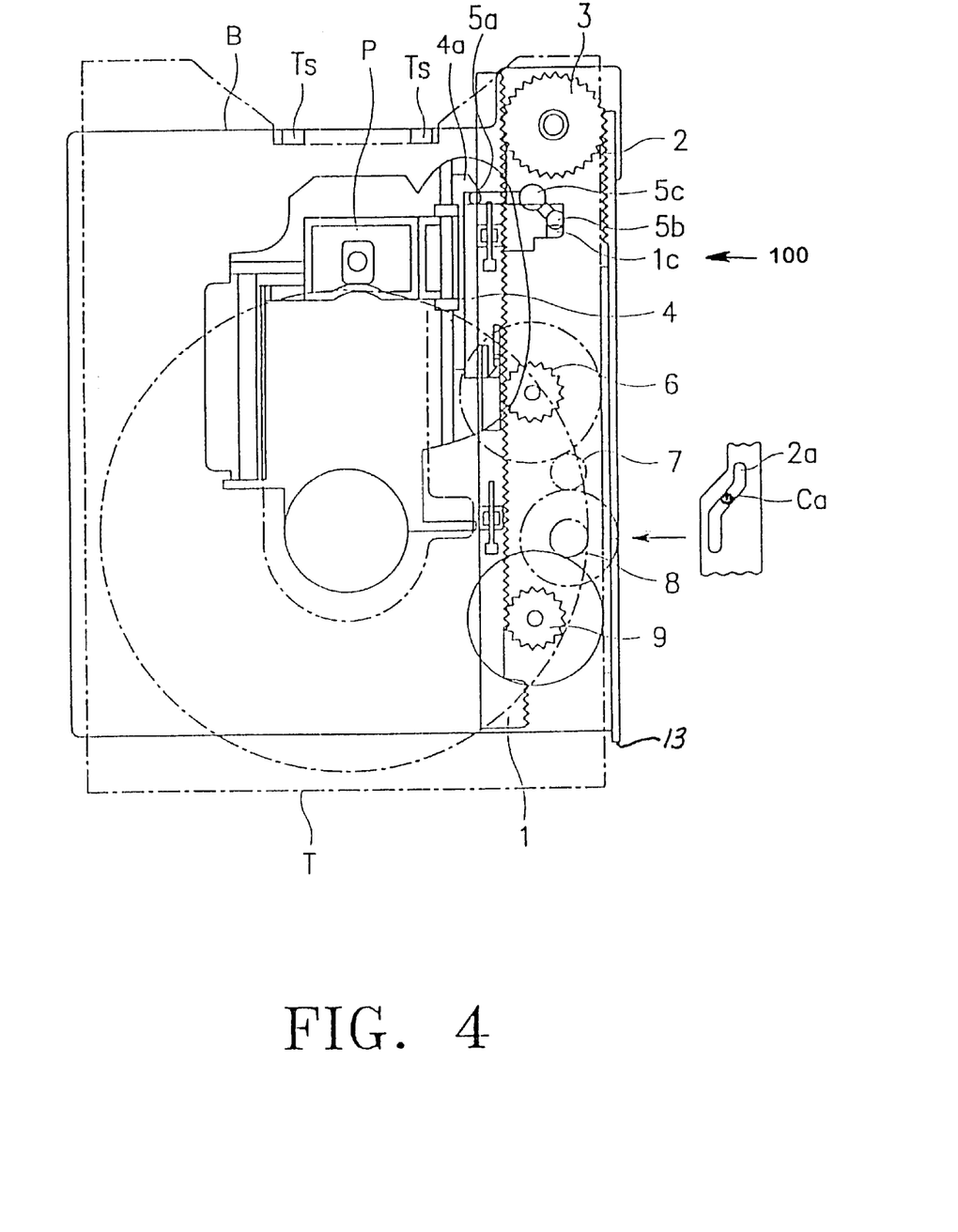
FIG. 4 is a top view of the loading mechanism in partial phantom cut-away for a disk device where a tray rack is moved further into the disk device.
Figure 5:
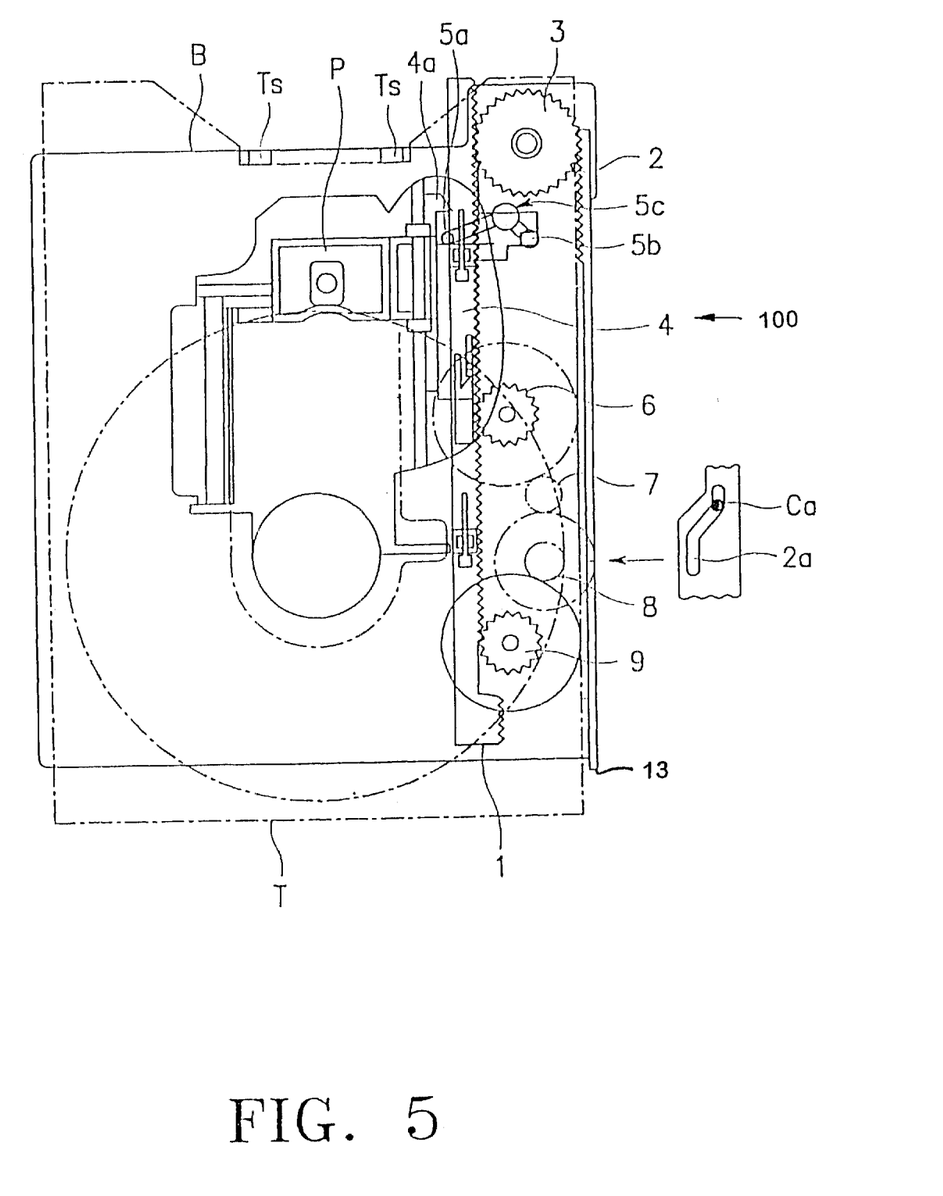
FIG. 5 is a top view of the loading mechanism in partial phantom cut-away for a disk device where a disk pickup and feeding operation has been initiated.
Figure 6:
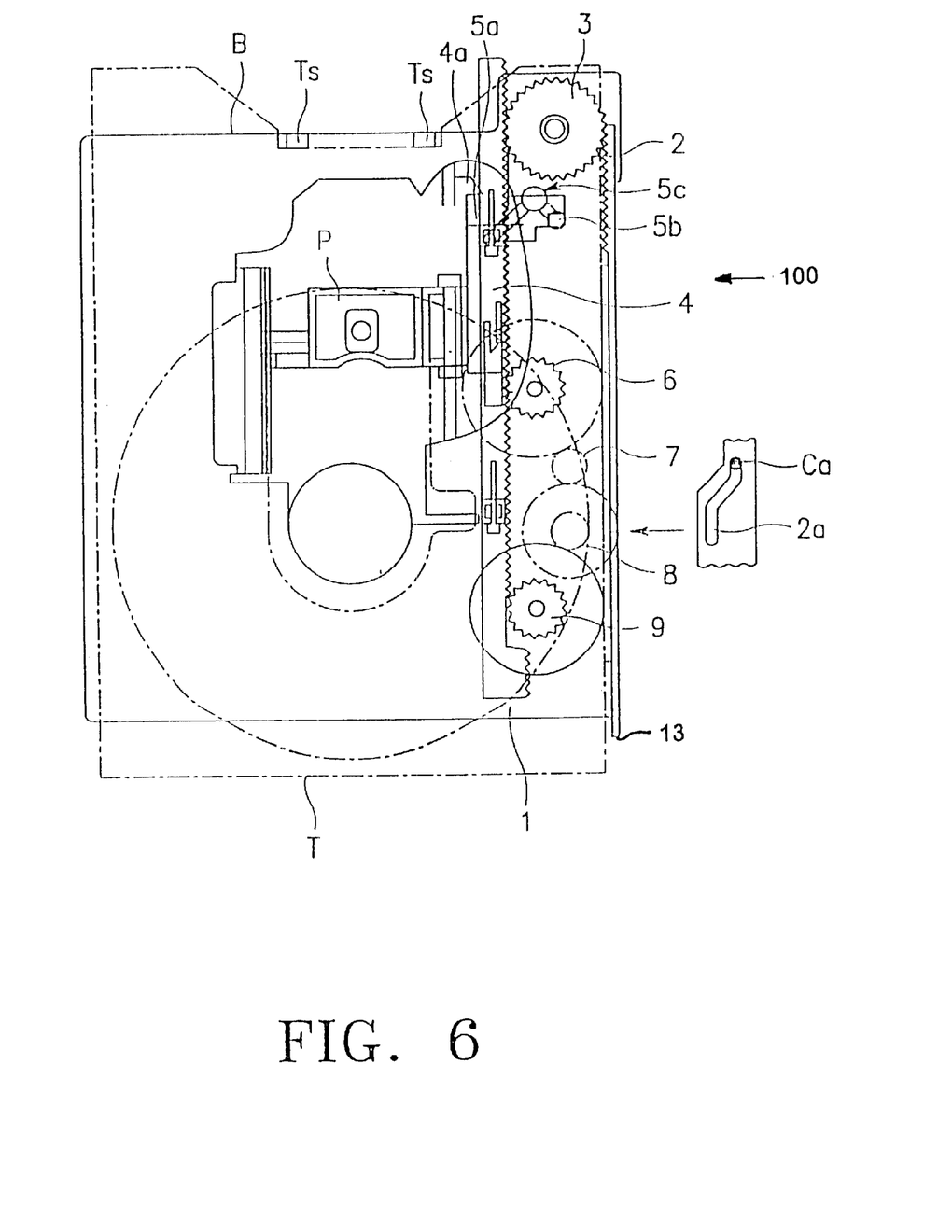
FIG. 6 is a top view of the loading mechanism in partial phantom cut-away for a disk device where the disk pickup and feeding operation has ended.

Referring to FIGS. 1 through 6, there is illustrated a loading mechanism for a disk device in accordance with an embodiment of the present invention and designated generally by reference numeral 100. FIG. 1 is a top phantom view of the loading mechanism for a disk device where a disk loading tray is in a projected position. FIG. 2 is a top phantom view of the loading mechanism for a disk device where the disk loading tray is between the projected position and the received position. FIG. 3 is a top phantom view of the loading mechanism for a disk device where the disk loading tray is in the received position. FIGS. 4 through 6 are top phantom view of the loading mechanism for a disk device where a tray rack is moved toward the disk device after being operatively disengaged from the disk loading tray.

With reference to FIG. 1, the loading mechanism for a disk device 100 includes a tray rack 1 attached to a lower surface of a tray T via a sliding arrangement 1a. The sliding arrangement allows the tray rack 1 to be slid on the lower surface of the tray T and be received into a base B of the disk device. While the tray rack 1 is slid into the base B, an elastic hook 1b provided on the tray rack 1 of a hooking mechanism is engaged with a first stepped portion Ta provided on the tray T. The elastic hook 1b is preferably formed by cutting out a part of the tray rack 1 to form the elastic hook 1b with a claw-shaped configuration.

In order to assemble the tray rack 1 with the disk loading tray T, the tray rack 1 is formed with a rail-shaped groove into which the elastic hook 1b having the claw-shaped configuration projects. The elastic hook 1b is attached to the disk loading tray T via the sliding arrangement 1a which is provided to the lower surface of the disk loading tray T.

Figure 7A:
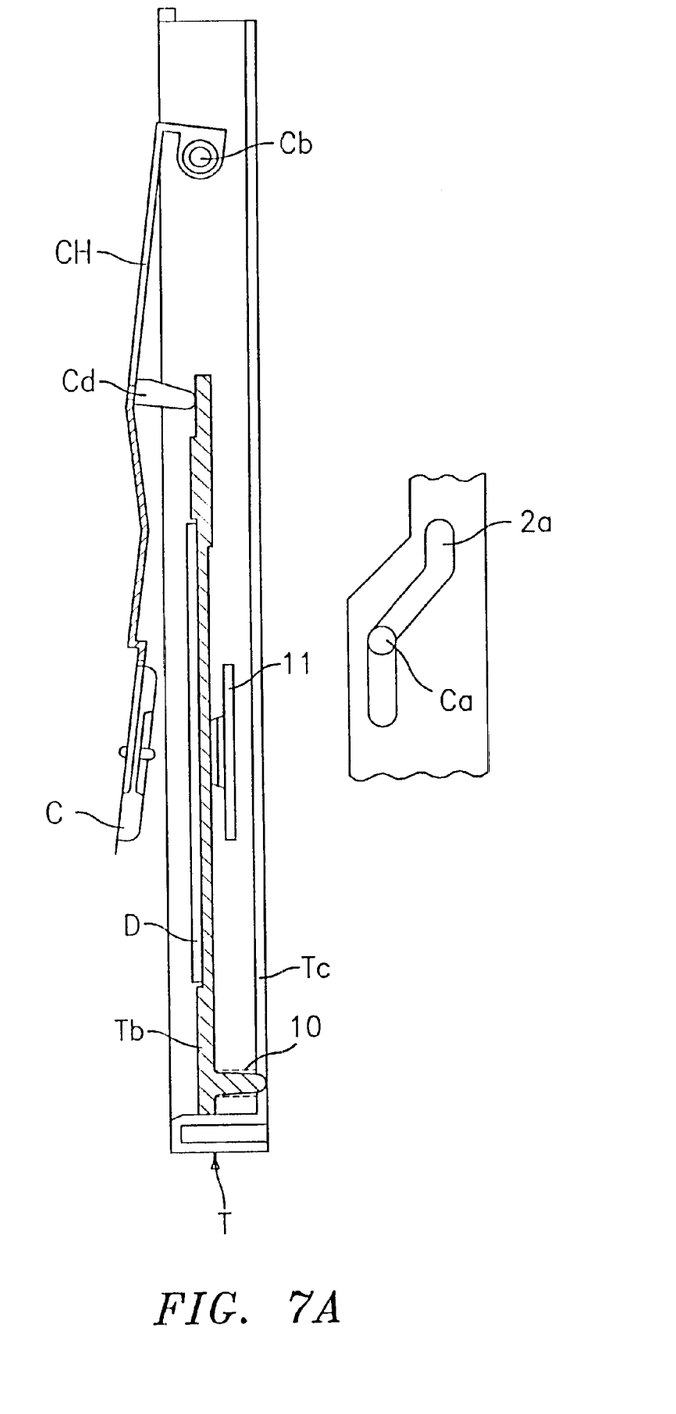
FIG. 7A is a cross-sectional side view of the disk loading tray and a damper in the unclamping position of the loading mechanism for a disk device.
Figure 7B:
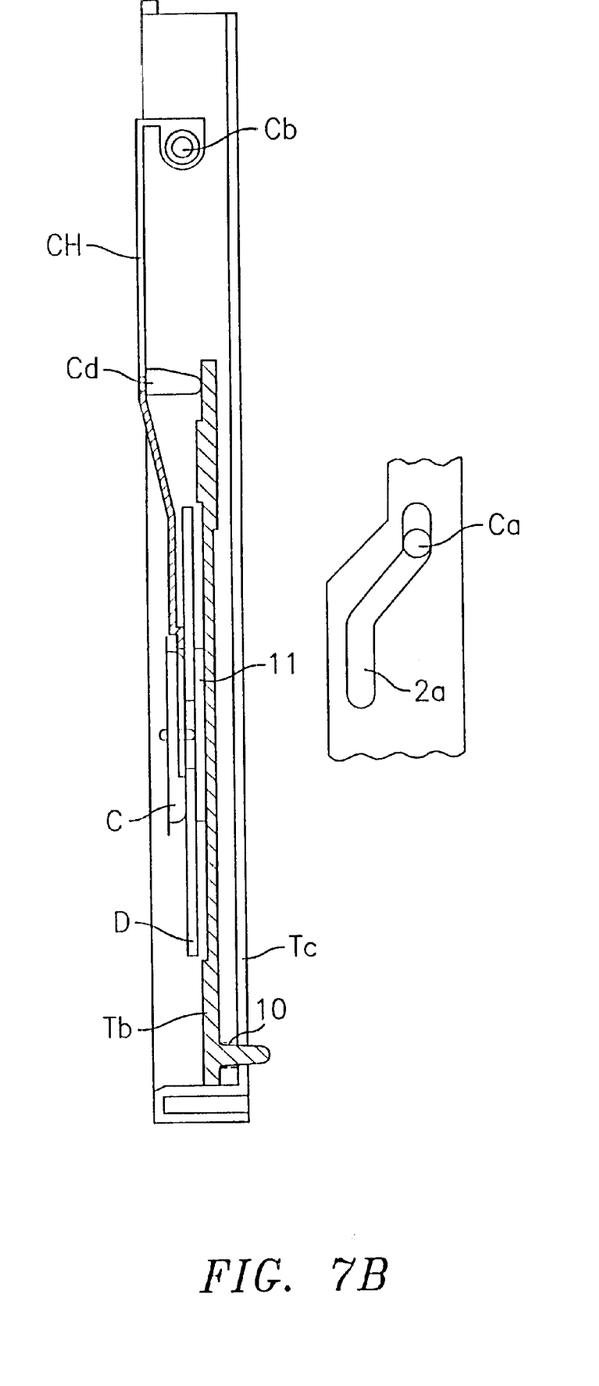
FIG. 7B is a cross-sectional side view of the disk loading tray and the damper in the clamping position of the loading mechanism for a disk device.

A slide rack 2 is located in the disk device such that it is operatively associated with a relay gear 3. The relay gear 3 is positioned adjacent a rear end of the disk device. The slide rack 2 is elongated and it extends from the relay gear 3 to a front end of the disk device. A camming groove 2a is formed in a side wall of the slide rack 2 near the front end of the disk device. A camming protrusion Ca provided on a damper holder CH (FIGS. 7A and 7B) for supporting a damper C, is inserted into the camming groove 2a. When the camming protrusion Ca is placed in an upper flat section of the camming groove 2a, as shown by the side illustration in FIG. 1, the damper C is maintained in an unclamping position.

A pickup P is attached to the base B having a spindle motor mounted thereon, such that the pickup P is operated by a pickup rack 4. A first boss portion 5a of a toggle lever 5 is fitted into a groove defined between the pickup rack 4 and a second stepped portion 4a. When the disk loading tray T is moved into or out of the disk device, the pickup rack 4 and a feed gear 6 are arranged such that they are not operatively associated with each other.

In FIG. 1, if a load gear 9 is rotated in a counterclockwise direction via an idle gear 8 as a motor gear 7 is driven by a load motor (not shown), the tray rack 1 is moved away from the disk device and the disk loading tray T is brought to a projected position. If a disk is placed on the disk loading tray T to perform a loading operation, the motor gear 7 is driven again by the load motor to rotate the load gear 9 in a clockwise direction. Consequently, the tray rack 1 is moved toward the disk device and the elastic hook 1b is engaged with the first stepped portion Ta, thereby moving the tray rack 1 and the disk loading tray T into the disk device.

Since the relay gear 3 is not driven during the loading operation, the slide rack 2 is held in its most rearward position to maintain the damper C in the unclamping position. Even though the feed gear 6 is also rotated by the motor gear 7, since it is not operatively associated with the pickup rack 4, the feed gear 6 is rotated in a no-load condition. Therefore, the pickup P is maintained in a latched position by fitting the first boss portion 5a of the toggle lever 5 into the groove defined between the pickup rack 4 and the second stepped portion 4a.

With reference to FIG. 2, the tray T is between the projected position and a received position. At this point, the tray rack 1 and relay gear 3 begin to be operatively associated, i.e., meshed, with each other. In FIG. 2, the disk loading tray T is illustrated as being projected to some extent from a front surface of the disk device, such that the disk loading tray T can be grasped by a user's hand to be taken out from the disk device. It is preferred that the disk loading tray T is spaced a distance of approximately 10 mm from a pair of tray stoppers TS positioned at a rear end of the disk device.

As the tray rack 1 and the relay gear 3 just begin to be meshed with each other, the slide rack 2 is still held in its most rearward position. Accordingly, the damper C is still maintained in the unclamping position. Further, since the positions of the toggle lever 5 and the pickup rack 4 are not changed, the feed gear 6 is rotated in the no-load condition and the pickup P is still maintained in the latched position.

With continued reference to FIG. 2, as the load motor is continuously rotated, the rear end of the disk loading tray T is brought into contact with the pair of tray stoppers TS. At this point the disk loading tray T is in the received position and the disk loading tray T cannot be further moved into the disk device, as shown by FIG. 3. While the disk loading tray T is moved toward the disk device by a distance of approximately 10 mm, i.e., from the position shown in FIG. 2 to the position shown in FIG. 3, the tray rack 1 is also moved toward the disk device by 10 mm. Therefore, the relay gear 3 becomes meshed with the tray rack 1 and the relay gear 3 is rotated clockwise. Consequently, since the slide rack 2 is meshed with the relay gear 3, the slide rack 2 is moved forward by a distance of 10 mm. At this point, since the length of the upper flat section of the camming groove 2a formed in the slide rack 2 is not less than 10 mm, the damper C is maintained in the unclamping position.

As the load motor continues to rotate, the engaging force between the elastic hook 1b and the first stepped portion Ta cannot continue to endure the rotating force of the load motor. As a result, the tray rack 1 is disengaged from the disk loading tray T and is independently moved further toward the disk device, as shown by FIG. 4. This independent and further movement of the tray rack 1, after being disengaged from the disk loading tray T, causes the relay gear 3 to keep rotating and the slide rack 2 to move further away from the disk device. Consequently, the camming protrusion Ca is guided into an inclined section of the camming groove 2a of the slide rack 2, as shown by the side illustration in FIG. 3, and the damper C begins to move toward a clamping position. Additionally, as a projection 1c formed in the tray rack 1 comes into contact with a second boss portion 5b of the toggle lever 5, the toggle lever 5 begins to be rotated counter-clockwise with respect to a shaft 5c.

As the load motor is continuously rotated, the tray rack 1 is unmeshed from the load gear 9, as shown by FIG. 5. Hence, as the slide rack 2 continues to move away from the disk device, the camming protrusion Ca formed in the damper holder CH is guided into a lower flat section of the camming groove 2a, as shown by the side illustration in FIG. 5, and the damper C is placed in the clamping position where it clamps a disk on a turntable. Additionally, the pickup rack 4 is moved away from the disk device by the first boss portion 5a of the toggle lever 5 which rotates counterclockwise with respect to the shaft 5c as the tray rack 1 is moved toward the disk device. As a result, the pickup rack 4 becomes operatively associated with the feed gear 6.

As the load motor continues to rotate, the tray rack 1 and the load gear 9 remain unmeshed and the pickup rack 4 is moved forward since the pickup rack continues to be meshed with the feed gear 6, as shown by FIG. 6. Accordingly, the load motor serves as a feed motor to rotate the feed gear 6 in a counterclockwise direction such that the pickup rack 4 is unlocked from the second stepped portion 4a to move the pickup P to an unlatched and operating position. At this point the tray rack 1 is at its most forward position and an untoothed portion of the tray rack 1 is opposed to the load gear 9. Therefore, even if the load gear 9 is rotated by the load motor, the load gear 9 is rotated in a no-load condition since the load gear 9 is not meshed with the teeth of the tray rack 1. Further, the tray rack 1 does not interfere with the operation of the pickup P, even though the feed gear 6 continues to be driven by the load motor.

An eject operation of the disk device of the present invention is achieved by performing the disk load operation and the pickup feed operation in a reverse order. It is contemplated to provide an eject button which when depressed causes the feed gear 6 to be rotated in a clockwise direction by the load motor, and the pickup rack 4 is retreated toward the latched position. Thereafter, as the first boss portion 5a is forced to move toward the rear of the disk device by the pickup rack 4, the toggle lever 5 is rotated in the clockwise direction. Consequently, the second boss portion 5b forces the tray rack 1 to move away from the disk device and become meshed with the load gear 9 (see FIG. 5).

As the tray rack 1 is moved away from the disk device while being meshed with the load gear 9, since the relay gear 3 is rotated in a counterclockwise direction, the slide rack 2 retreats and unclamps the disk from the clamp holder. Simultaneously, since the tray rack 1 is engaged with the disk loading tray T, the disk loading tray T is integrally moved away from the disk device together with the tray rack 1. Accordingly, the disk loading tray T is projected out of the disk device through the driving of the load gear 9 by the load motor, whereby the disk loading tray T is placed in the projected position.

If the clamping operation fails during the disk loading operation or some other malfunction occurs, it may become necessary to perform an emergency ejecting operation to remove the disk from the disk device manually. In a preferred embodiment of the present invention, the emergency ejecting operation is performed by forcibly causing the slide rack 2 to move toward the rear of the disk device. In order to forcibly cause the slide rack 2 to move toward the rear of the disk device, projecting means 13 (FIG. 4) are provided to the slide rack 2 which project out of the disk device as the slide rack 2 is moved toward the rear of the disk device. By manually depressing the projecting means 13, the loading mechanism is disengaged and the slide rack 2 is forcibly moved toward the rear of the disk device.

Upon movement of the slide rack 2 toward the rear of the disk device, the camming protrusion Ca is moved along the camming groove 2a and the damper C is moved from the clamping position to the unclamping position. At the same time as the damper C is moved to the unclamping position, the tray rack 1 is moved away from the disk device by the forcible and reverse rotation of the relay gear 3. The tray rack 1 is then engaged with the disk loading tray T via the hooking mechanism described above and both components are integrally moved away from the disk device. The tray rack 1 and disk loading tray T are moved until the tray rack 1 is operatively disengaged or unmeshed from the relay gear 3. Further, if the tray rack 1 and disk loading tray T are in the position as shown by FIG. 2, i.e., a front end of the disk loading tray T projects by a distance of about 10 mm from the front surface of the disk device, the disk loading tray T can be manually pulled to the projected position.

When the disk loading tray T is pulled into the projected position, the load gear 9 is rotated in a counter-clockwise direction by the forward movement of the tray rack 1 and the feed gear 6 is rotated in a clockwise direction via the idle gear 8 and the motor gear 7. Accordingly, the pickup rack 4 is moved to the latched position where it is automatically latched by the first boss portion 5a of the toggle lever 5.

When the emergency ejecting operation or the normal ejecting operation is performed, since the damper holder CH is mounted using a hinge shaft Cb and pivots with respect to the hinge shaft Cb, the force required for unclamping the disk is reduced. Also, in a preferred embodiment of the present invention, the disk loading tray T has a double-layered structure which includes a guide tray Tb for loading the disk thereon and a tray body Tc. The guide tray Tb is elastically biased by elastic biasing means 10 so that it can be slid against the tray body Tc. In the projected position of the disk loading tray T, the guide tray Tb is raised to load the disk thereon. In the received position of the disk loading tray T, the damper holder CH is lowered and the guide tray Tb is depressed by a protrusion Cd provided to the damper holder CH. Consequently, the disk is supported on the turntable 11 and is clamped by the damper C. In this structure, the elastic force of the guide tray Tb functions to supplement the unclamping operation of the clamper holder CH and to reduce the unclamping force.

The loading mechanism for a disk device according to the present invention provides advantages since the disk loading operation and the pickup feeding operation are performed by a single motor. As a result, the manufacturing cost is reduced and space utilization within the disk device is improved. Further, the timing of the clamp after a disk has been loaded is ensured, thereby improving reliability of the clamp and effecting stable operation of the disk device. Further, even when a disk is abnormally loaded, an emergency ejecting operation can be performed by a simple manipulation to easily remove the disk from the disk device.

Although an illustrative embodiment of the present invention has been described herein with reference to the accompanying drawings, it is to be understood that the invention is not limited to that precise embodiment, and that various other changes and modifications may be affected therein by one skilled in the art without departing from the scope or spirit of the invention. All such changes and modifications are intended to be included within the scope of the invention as defined by the appended claims.

What is claimed is:

1. A loading mechanism for a disk device, the disk device being of the type having a disk loading tray movable between a projected position and a received position with respect to a base of the disk device, the loading mechanism comprising:
   a tray rack attached to said disk loading tray and having means for engaging a load gear, said load gear being rotated by a motor for moving said disk loading tray between the projected position and the received position;
   a relay gear operatively associated with the tray rack, said relay gear being rotated by said tray rack as the disk loading tray is moved between the projected position and the received position;
   a slide rack operatively associated with the relay gear, said slide rack being moved between a first slide rack position and a second slide rack position by the rotation of said relay gear;
   a disk clamping mechanism operatively associated with said slide rack, said disk clamping mechanism having a damper movable between an unclamping position and a clamping position, said damper being moved between said unclamping position and said clamping position by said slide rack as the slide rack moves between said first slide rack position and said second slide rack position; and
   means for toggling operatively associated with said tray rack for moving a data read/write pickup device between a non-operating position and an operating position as said disk loading tray is moved between the projected position and the received position.

2. The loading mechanism according to claim 1, wherein said means for toggling includes a toggle lever configured to pivot as the disk loading tray is moved between the projected position and the received position and a pickup rack engaging said toggle lever, said pickup rack operatively associated with said data read/write pickup device to move said pickup device between the non-operating position and the operating position as said toggle lever pivots.

3. The loading mechanism according to claim 1, wherein the slide rack includes means for camming to provide a camming force to said disk clamping mechanism for moving said damper between the unclamping position and the clamping position.

4. The loading mechanism according to claim 1, further comprising ejecting means operatively associated with said tray rack for moving said disk loading tray away from the received position.

5. The loading mechanism according to claim 4, wherein said ejecting means is further operatively associated with said disk clamping mechanism for moving said damper away from the clamping position.

6. The loading mechanism according to claim 1, wherein said tray rack comprises a hooking mechanism for hooking said disk loading tray for moving said disk loading tray between the projected position and the received position.

7. The loading mechanism according to claim 6, wherein said tray rack is unhooked from said disk loading tray and independently moves within said base when said disk loading tray is in the received position.

8. The loading mechanism according to claim 7, wherein said means for engaging disengage said load gear after said tray rack is independently moved within said base.

9. The loading mechanism according to claim 1, wherein said disk clamping mechanism further includes a damper holder supporting said damper on a first end and being pivotably mounted to said disk device on a second end by a hinge shaft.

10. The loading mechanism according to claim 1, wherein said disk loading tray includes a guide tray configured for placing a disk thereon and a tray body, said guide tray being elastically biased by elastic biasing means for sliding against said tray body.

11. The loading mechanism according to claim 10, wherein in the projected position of said disk loading tray said guide tray is configured to raise with respect to said tray body for placing said disk on said guide tray.

12. A loading mechanism for a disk device, the disk device being of the type having a disk loading tray movable between a projected position and a received position with respect to a base of the disk device, the loading mechanism comprising:
   at least one gear rotated by a motor and operatively associated with a tray rack attached to said disk loading tray, said at least one gear for moving said disk loading tray between the projected position and the received position;
   a slide rack operatively associated with said at least one gear, said slide rack being moved between a first slide rack position and a second slide rack position by the rotation of said gear;
   a disk clamping mechanism operatively associated with said slide rack, said disk clamping mechanism having a damper movable between an unclamping position and a clamping position, said damper being moved between said unclamping position and said clamping position by said slide rack as the slide rack moves between said first slide rack position and said second slide rack position; and
   means for toggling operatively associated with said tray rack for moving a data read/write pickup device between a non-operating position and an operating position.

13. The loading mechanism according to claim 12, wherein said means for toggling includes a toggle lever configured to pivot as the disk loading tray is moved between the projected position and the received position and a pickup rack engaging said toggle lever, said pickup rack operatively associated with said data read/write pickup device to move said pickup device between the non-operating position and the operating position as said toggle lever pivots.

14. The loading mechanism according to claim 12, wherein the slide rack includes means for camming to provide a camming force to said disk clamping mechanism for moving said damper between the unclamping position and the clamping position.

15. The loading mechanism according to claim 12, further comprising ejecting means operatively associated with said tray rack for moving said disk loading tray away from the received position.

16. The loading mechanism according to claim 15, wherein said ejecting means is further operatively associated with said disk clamping mechanism for moving said damper away from the clamping position.

17. The loading mechanism according to claim 12, wherein said disk clamping mechanism further includes a damper holder supporting said damper on a first end and being pivotably mounted to said disk device on a second end by a hinge shaft.

18. A loading mechanism for a disk device, the disk device being of the type having a disk loading tray movable between a projected position and a received position with respect to a base of the disk device, the loading mechanism comprising:

a tray rack attached to said disk loading tray and having means for engaging a load gear, said load gear being rotated by a motor for moving said disk loading tray between the projected position and the received position, wherein said disk loading tray includes a guide tray configured for placing a disk thereon and a tray body, said guide tray being elastically biased by elastic biasing means for sliding against said tray body;

a relay gear operatively associated with the tray rack for being rotated as the disk loading tray is moved between the projected position and the received position, wherein in the received position of said disk loading tray of said damper holder is lowered and said guide tray is depressed by said damper holder for moving said damper to the clamping position;

a slide rack operatively associated with the relay gear and a disk clamping mechanism having a damper movable between an unclamping position and a clamping position as the relay gear rotates; and means for toggling operatively associated with said tray rack for moving a data read/write pickup device between a non-operating position and an operating position as said disk loading tray is moved between the projected position and the received position.

19. A loading mechanism for a disk device, the disk device being of the type having a disk loading tray movable between a projected position and a received position with respect to a base of the disk device, the loading mechanism comprising:

a tray rack attached to said disk loading tray and having means for engaging a load gear, said load gear being rotated by a motor for moving said disk loading tray between the projected position and the received position;

a relay gear operatively associated with the tray rack for being rotated as the disk loading tray is moved between the projected position and the received position;

a slide rack operatively associated with the relay gear and a disk clamping mechanism, wherein the slide rack includes means for camming to provide a camming force to said disk clamping mechanism, said means for camming including a camming groove and a camming protrusion protruding from a damper holder of said disk clamping mechanism, said camming protrusion being inserted within said camming groove to provide the camming force to said disk clamping mechanism for moving said damper between the unclamping position and the clamping position as the relay gear rotates; and means for toggling operatively associated with said tray rack for moving a data read/write pickup device between a non-operating position and an operating position as said disk loading tray is moved between the projected position and the received position.

20. A loading mechanism for a disk device, the disk device being of the type having a disk loading tray movable between a projected position and a received position with respect to a base of the disk device, the loading mechanism comprising:

at least one gear operatively associated with a tray rack attached to said disk loading tray for moving said disk loading tray between the projected position and the received position;

a slide rack operatively associated with said at least one gear and a disk clamping mechanism, the slide rack including means for camming to provide a camming force to said disk clamping mechanism, said means for camming including a camming groove and a camming protrusion protruding from a damper holder of said disk clamping mechanism, said camming protrusion being inserted within said camming groove to provide the camming force to said disk clamping mechanism for moving said damper between the unclamping position and the clamping position; and means for toggling operatively associated with said tray rack for moving a data read/write pickup device between a non-operating position and an operating position as said disk loading tray is moved between the projected position and the received position.

* * * * *